US009563515B2

(12) United States Patent
Oberhofer et al.

(10) Patent No.: US 9,563,515 B2
(45) Date of Patent: Feb. 7, 2017

(54) DATA BACKUP OR RESTORE USING MAIN MEMORY AND NON-VOLATILE STORAGE MEDIA

(71) Applicant: International Business Machines Corporation, Armonk, NY (US)

(72) Inventors: Martin Oberhofer, Boeblingen (DE); Michail Tausch, Ehningen (DE); Andreas Trinks, Stuttgart (DE); Andreas Uhl, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/840,508

(22) Filed: Aug. 31, 2015

(65) Prior Publication Data
US 2015/0378838 A1    Dec. 31, 2015

Related U.S. Application Data

(63) Continuation of application No. 13/911,570, filed on Jun. 6, 2013, now Pat. No. 9,176,679.

(30) Foreign Application Priority Data

Aug. 21, 2012    (GB) .................................. 1214854.0

(51) Int. Cl.
*G06F 12/16* (2006.01)
*G06F 11/14* (2006.01)
(Continued)

(52) U.S. Cl.
CPC .......... *G06F 11/1458* (2013.01); *G06F 3/061* (2013.01); *G06F 3/065* (2013.01); *G06F 3/0608* (2013.01);
(Continued)

(58) Field of Classification Search
CPC .............. G06F 11/1458; G06F 11/1461; G06F 11/1464; G06F 11/1469
(Continued)

(56) References Cited

U.S. PATENT DOCUMENTS 7,305,421 B2    12/2007    Cha et al.
7,917,472 B2    3/2011    Persson
(Continued)

OTHER PUBLICATIONS

Search Report under Section 17(5) dated Dec. 18, 2012, GB Application No. GB1214854.0, 3 pages.
(Continued)

*Primary Examiner* — Than Nguyen
(74) *Attorney, Agent, or Firm* — Francis Lammes; Stephen J. Walder, Jr.; Richard A. Wilhelm

(57) ABSTRACT

The invention relates to a computer implemented method for creating a backup of data by a computer system. The creation of the backup comprises: assigning a first memory space in a main memory to data and loading the data into the first memory space; allocating a second memory space in the main memory for acting as container of one or more images of the data in the first memory space; creating the one or more images of the data in the first memory space; and storing the created one or more images in the second memory space and storing a respective copy of at least one of the one or more images in the one or more non-volatile storage media.

17 Claims, 3 Drawing Sheets

(51) Int. Cl.
*G06F 3/06* (2006.01)
*G06F 11/16* (2006.01)
*G06F 11/20* (2006.01)

(52) U.S. Cl.
CPC ........... *G06F 3/0619* (2013.01); *G06F 3/0683* (2013.01); *G06F 3/0685* (2013.01); *G06F 3/0688* (2013.01); *G06F 11/1441* (2013.01); *G06F 11/1461* (2013.01); *G06F 11/1464* (2013.01); *G06F 11/1469* (2013.01); *G06F 11/1666* (2013.01); *G06F 11/20* (2013.01); *G06F 2201/84* (2013.01)

(58) Field of Classification Search
USPC .................................................. 711/162, 161
See application file for complete search history.

(56) References Cited

U.S. PATENT DOCUMENTS

| | | | |
|---|---|---|---|
| 8,046,557 | B2 | 10/2011 | Chen |
| 2002/0093691 | A1 | 7/2002 | Durrant et al. |
| 2007/0198283 | A1 | 8/2007 | Labuda et al. |
| 2009/0183027 | A1* | 7/2009 | Subhraveti ............. 714/13 |
| 2010/0005258 | A1 | 1/2010 | Westenberg |
| 2010/0077164 | A1 | 3/2010 | Stiffler et al. |
| 2010/0122052 | A1* | 5/2010 | Waldspurger et al. ....... 711/162 |
| 2010/0138391 | A1 | 6/2010 | Namikawa et al. |
| 2011/0004583 | A1 | 1/2011 | Honda |
| 2011/0082996 | A1 | 4/2011 | Wester et al. |
| 2011/0113208 | A1* | 5/2011 | Jouppi et al. ............ 711/162 |
| 2011/0246425 | A1 | 10/2011 | Munoz |
| 2013/0332660 | A1* | 12/2013 | Talagala et al. ............ 711/103 |

OTHER PUBLICATIONS

U.S. Appl. No. 13/911,570, 2 pages.
Huang, Yunkui et al., "A Data Distribution Strategy for Scalable Main-Memory Database", Advances in Web and Network Technologies, and Information Management Lecture Notes in Computer Science, vol. 5731, 2009, 7 pages.
Yanjun, Tang et al., "A Model of Crash Recovery in Main Memory Database", 2010 International Conference on Computer Design and Applications (ICCDA 2010), vol. 5, Jun. 25-27, 2010, pp. V5-206-V5-207.

* cited by examiner

DATA BACKUP OR RESTORE USING MAIN MEMORY AND NON-VOLATILE STORAGE MEDIA

The invention relates to the field of data processing, and more particularly to the back-up and/or restoring of data.

In current backup- and restore technologies, a common problem is that restoring data from a backup can be very time-consuming. Backup- and restore technologies for restoring data from non-volatile storage media are often slow as the non-volatile storage media often have long response times. Using comparatively fast non-volatile storage media tends to be expensive. Non-volatile storage media having short response times are therefore often not available in sufficient capacity. As a consequence, the number of backups and the time period covered by the backups may strongly be limited. A further problem is that many current backup strategies do not cover in-memory data structures which are computationally expensive to create. Thus, the data structures have to be created again when restoring the backup, thus further increasing the time required for a complete restore of the original system state.

SUMMARY

It is an objective of embodiments of the invention to provide for an improved computer implemented method, computer-readable medium and computer system for creating data back-ups and/or for restoring data. The objective is solved by the features of the independent claims. Preferred embodiments are given in the dependent claims. If not explicitly indicated otherwise, embodiments of the invention can be freely combined with each other.

In one aspect, the invention relates to a computer implemented method for creating a backup of data by a computer system being operatively coupled to a main memory and to one or more non-volatile storage media. Creating the backup comprises:
 assigning a first memory space in the main memory to the data and loading the data into the first memory space;
 allocating a second memory space in the main memory for acting as container of one or more images of the data in the first memory space;
 automatically creating the one or more images of the data in the first memory space; and
 automatically storing the created one or more images in the second memory space and storing a respective copy of at least one of the one or more images in the one or more non-volatile storage media, the storing in the second memory space and in the storing in the one or more non-volatile storage media being executed in accordance with one or more predefined backup-rules.

In a further aspect, the invention relates to a computer program product comprising a computer-readable medium comprising computer-readable program code embodied therewith. Upon execution of the computer-readable program by a processor, the computer-readable program cause the processor to perform various ones of, and combinations of, the operations outlined above with regard to the method according to the embodiments described above.

In a further aspect, the invention relates to a computer system comprising one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

In the following, preferred embodiments of the invention will be described in greater detail by way of example, only making reference to the drawings in which.

DETAILED DESCRIPTION

Figure 1:
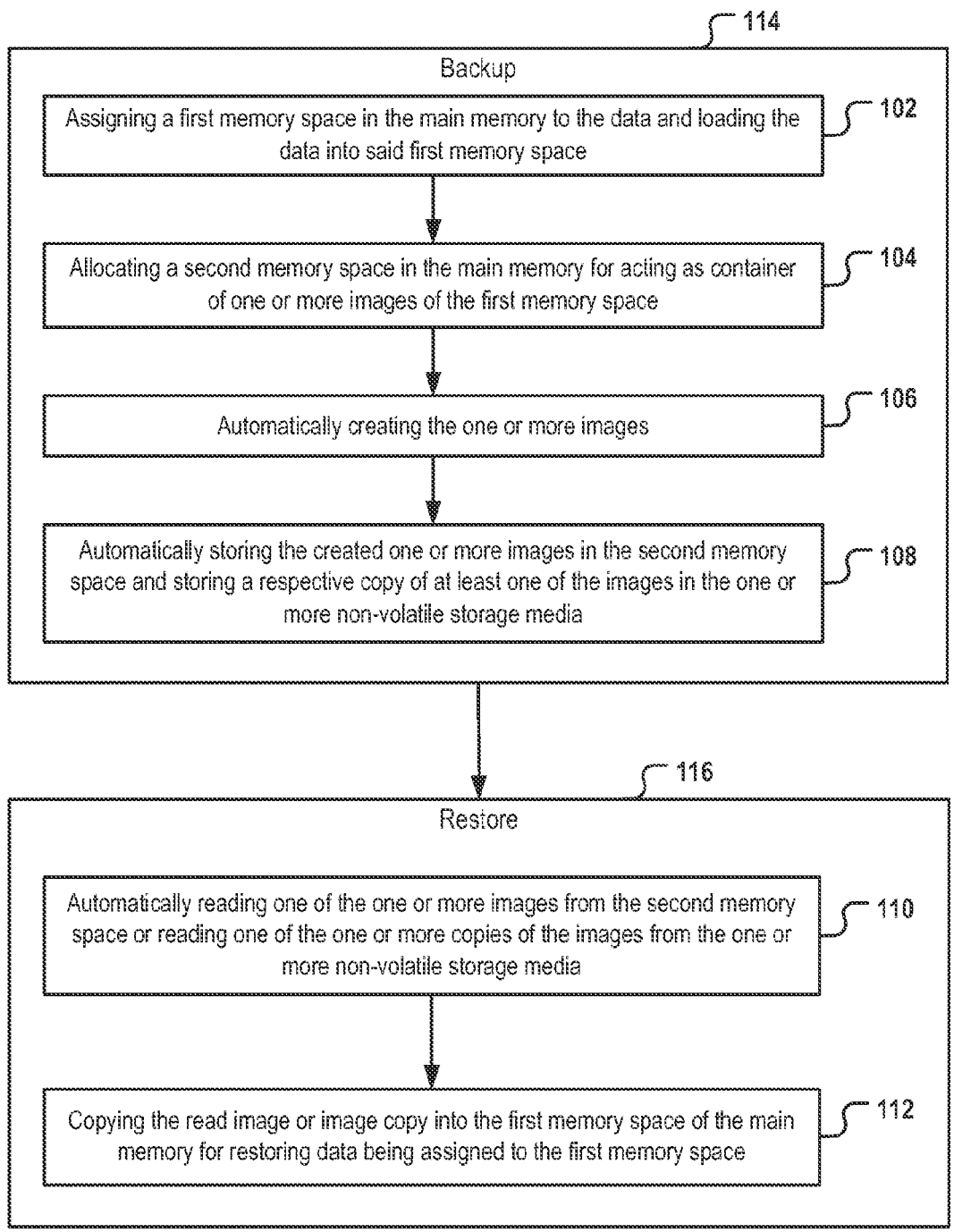
FIG. 1 shows a flowchart of an embodiment of the inventive method.

An 'image' of a first memory space as used herein is a piece of data being a derivative of the data content of the first memory space and comprising all necessary information for allowing the restoring of the totality of data being stored in the first memory space at the moment in time when the image is created. The image should not be considered to be limited to the creation of a physical copy of each memory block in the first memory space. According to some embodiments, the image may be created based on the physical copies, but according to other embodiments discussed later, the image may be based on pointers to modified and/or unmodified portions of the first memory space. Preferentially, the image is stored in association with a time stamp being indicative of the creation time of the image. In dependence on the kind of data being stored in the memory when the image was created, the image may comprise computer-interpretable instructions of an application program loaded into the first memory space and/or may comprise payload data (i.e., non-executable data) which is used as input or generated as output by the application program. For example, the instructions may have the form of bytecode and/or of a source file written in a scripting language loaded into the memory.

The term 'data' as used herein covers executable code, payload data or any combination thereof Preferentially, the data relates to a functionally coherent set of data consisting e.g. of computer-interpretable instructions of an application program, e.g. a database management system, and some payload-data processed by the application program, e.g. the data content of a database and/or some index structures having been generated from the data content.

An 'application program' as used herein is a software program comprising computer-executable instructions. Examples of an application program are relational or columnar database management systems, e-Commerce application programs, Enterprise resource planning (ERP) systems, content management system (CMS) or the like.

A 'relational database' as used herein is a database wherein data is organized in the form of one or more tables, wherein each data record corresponds to one line of at least one of the tables, wherein each column represents a parameter of a data object. Examples of relational database management systems are MySQL® or PostgreSQL®.

A 'columnar database' as used herein is a database wherein data is organized in the form of one or more columns respectively comprising one or more distinct parameter values, e.g. in the form of an ordered list. Each of the distinct parameter values is stored in association with one or more object-IDs of data objects being characterized by the parameter value. Examples of columnar database management systems are Vertica® and Sybase® IQ.

A 'non-volatile computer-readable storage medium' or 'non-volatile storage medium' as used herein is any kind of storage medium operable to permanently store computer-interpretable data. 'Permanent storage' as used herein can retain the stored data even when not powered. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

The term 'memory' as used herein relates to any kind of volatile storage medium acting as the main memory of a computer system. Memory requires power to maintain its stored data. A memory may be, for example, but not limited to, a random access memory (RAM), e.g. a dynamic RAM (DRAM) or a static RAM (SRAM), e.g. a double data rate synchronous dynamic random-access memory (DDR SDRAM).

A 'storage tier' as used herein is a group of volatile and/or non-volatile storage resources that match a predefined set of capabilities, such as, for example, minimum I/O response time.

In one aspect, the invention relates to a computer implemented method for creating a backup of data by a computer system being operatively coupled to a main memory and to one or more non-volatile storage media. Creating the backup comprises:

assigning a first memory space in the main memory to the data and loading the data into the first memory space;

allocating a second memory space in the main memory for acting as container of one or more images of the first memory space;

automatically creating the one or more images; and automatically storing the created one or more images in the second memory space and storing a respective copy of at least one of the images in the one or more non-volatile storage media, the storing in the second memory space and in the storing in the one or more non-volatile storage media being executed in accordance with one or more predefined backup-rules.

The features may be advantageous, because in dependence on one or more predefined backup-rules executed at runtime of a computer system, an automated decision is taken if the content of some first memory space and thus the executable and/or non-executable content of a particular application program or program module should be stored in the (fast but usually expensive) memory and/or should be stored on one or more (usually not as fast but cheaper) non-volatile storage media. Thus, by reserving and considering some parts of the memory as a further backup layer, the backup process can be accelerated. At least in use-case scenarios, e.g. in cloud service environments, wherein the data assigned to the first memory space shall be provided in form of a further copy of the data to other clients, creating in-memory backups may increase the performance of providing the data to the service clients, while the copies of the images stored to non-volatile storage media may in addition provide protection against system outages and power failures. According preferred embodiments, the first memory space is a logically defined memory space, i.e., its physical memory blocks are not necessarily arranged in consecutive order but may be spread over the main memory.

According to embodiments, the data backup and/or restore method is executed by a server computer system which may be part of a cloud service environment. A 'server computer system' or 'server' as used herein is any kind of data processing system delivering data as a service to one or more clients. The server computer system receives one or more requests from respective client computer systems for the data contained in the first memory space. For example, the data in the first memory space could be a database management system and the respective client computer systems could request some data contained in the database. In case the number of clients exceeds a threshold or in case the load of the computer system comprising the memory exceeds a load threshold, the data is restored as a further instance from one of the images or image copies on another server computer comprising its own memory and processing unit(s). Preferentially, the restore rules will read the data from the second memory space having short response times. In some cases, e.g. upon a power failure, the data may alternatively be read from one of the image copies stored on a non-volatile storage medium. Thus, embodiments of the invention may provide a backup- and/or restore facility for service clients with zero downtime and very short delays for providing in-memory data to one or more requesting clients.

Preferentially, the size of the first memory space is chosen in a way that it is guaranteed that all the (executable and non-executable) data relating to a particular functional module or application program, fits into the first memory space throughout the life-time of the functional module or application program. Thus, as the size of the data currently processed by the application program in memory may vary over time, the data typically consumes only a dynamically varying fraction of the first memory space. According to some embodiments, the data having assigned the first memory space consist of executable and/or non-executable data of an application program, e.g. a relational or columnar database management system.

According to embodiments, assigning the first memory space to the data is initiated by an application program requesting the first memory space from the operating system (OS) upon starting the application program. According to other embodiments, the application program requests the first memory space from a management module, wherein the management module then requests the first memory space from the OS.

According to embodiments, the backup-and/or restore rules select the second memory space or one of the non-volatile storage media in dependence on parameters which are determined and evaluated dynamically during the execution of the rules. The parameters may relate to system parameters being indicative of the state of a storage management system, of an application program constituting the data assigned to the first memory space, of the number of clients, network traffic, available free capacity in the second memory space and/or in the non-volatile storage media, or the like. Thus, by considering and treating the second memory space as one further backup- and restore medium characterized by particular short response times, the optimum backup- and restore strategy in terms of time and storage costs and in respect to the avoidance of service bottlenecks can be accomplished automatically without any manual user interaction.

In a further aspect, the invention relates to a computer implemented method for restoring data. The method is executed by a computer system operatively coupled to a main memory and to one or more non-volatile storage media. The main memory comprises a first memory space and a second memory space. The second memory space is a container having stored one or more images of the first memory space taken at respective previous moments in time. The one or more non-volatile storage media comprise one or more copies of respective ones of the images. The restoring comprises:

automatically reading one of the or more images from the second memory space or reading one of the one or more copies of the images from the one or more non-volatile storage media, the reading being executed in accordance with one or more predefined restore-rules; and copying the read image or image copy into the first memory space of the main memory for restoring data being assigned to the first memory space.

In analogy to the backup-method, the features may be advantageous as they provide for a fully automated and highly dynamic restore strategy. In dependence on the requirements of the client or on other system parameters determined at runtime, the data may be restored very quickly from the second memory space. Alternatively, the data may be restored from one of the non-volatile storage media typically having stored a higher number of images than the second memory space and thus having stored image copies covering a larger time period than the images stored in the second memory space.

According to embodiments, the data is an application program or a functional module thereof. The application program or the functional module are loaded into the first memory space for executing the application program or for executing the module. The assignment prohibits the application program from using or occupying any memory block outside the first memory space. According to some embodiments, the backup- and/or restore-rules are application specific. This may be advantageous as an automatically executed and application-specific backup and/or restore-strategy is provided which is specifically adapted to the particularities of the application program and/or to the particularities of the users of the application program. For example, a company may provide two different application programs to a plurality of employees in a client-server environment. Embodiments of the invention may allow to create backups of one of the application programs more frequently than for the other application program. This may be particularly advantageous if the high relevance of the data of the first application program for the employees renders a high-availability of the particular application program necessary. By prioritizing the backup-strategies and corresponding rules of some selected applications, it is possible to make a more effective use of available storage capacities.

According to embodiments, the data is a database management program, also referred herein as 'database management system' (DBMS). The application program having been loaded into the first memory space and/or the one or more stored images and/or image copies respectively comprise one or more indices of the database, and/or one or more read optimized stores (ROS) of the database and/or one or more write optimized stores (WOS) of the database. The one or more indices may be, for example, indices allowing fast in-memory access to data of in-memory databases. The indices are not persisted in current in-memory database systems and have to be rebuilt upon initiating the in-memory database. The DBMS may be an in-memory database or a conventionally database loading data into bufferpools which are loaded into memory. Assigning a database management system the first memory space and executing the backup- and/or restore operations in accordance with embodiments of the invention may be advantageous in particular for database management systems, because using DBMS typically comprises the creation of data structures such as indices, ROS or WOS which are computationally expensive to create. An in-memory, write-optimized store (WOS) of a DBMS stores, in a row-wise fashion, data that is not yet written to disk. Thus, a WOS acts as a cache for the database. A read-optimized store (ROS) of a DBMS comprises one or more ROS containers. A ROS container stores one or more columns for a set of rows in a special format, e.g. a columnar format or "grouped ROS" format. The storing of data in a ROS may comprise the application of computationally demanding data compression algorithms. For example, in relational in-memory databases such as SolidDB, an in-memory copy is created from some non-volatile disk based data and instructions. The in-memory database is used as a cache between a client and the non-volatile disk based data and instructions. The backup and/or restore approaches currently applied on the in-memory databases are based on the non-volatile disk based data and instructions of the DBMS. Therefore, whenever such a relational in-memory database is restored from a conventionally created backup, all index structures have to be re-created when loading the database into the main memory, because the index structures existed only in the main memory and were never included in the backup. Existing backup- and restore-strategies applied e.g. for several relational in-memory databases comprise a first step of loading a backup into the main memory, herein also referred as 'memory', and a (computationally highly demanding) second step comprising the creation of supplementary data structures such as indices. An analogous situation exists for columnar data structures being created from a relational database scheme stored on the non-volatile storage medium. Restoring a relational database system or a columnar database system from a backup of an existing database (upon a system outage or upon receiving a request by a cloud service environment for creating a new instance of a relational or columnar database) from a backup of an existing database may therefore require a considerable amount of time. The problems often result in long response times of databases or cloud service based data provisioning services accessed by a client application and may even result in additional downtimes of a system caused by an ongoing data restore process. Embodiments of the invention may be advantageous, as they may overcome the deficiencies by backing up the data which is contained in the memory of a system.

In contrast to existing database-backup approaches, embodiments of the invention backup the content of the memory, not the data content stored to a non-volatile storage medium. Thus, all data structures having been created while or after loading the database into memory for preparing the database for usage by one or more clients are covered by the present backup- and/or restore approach. Indices, ROS, WOS and/or columnar data structures which may be contained solely in the memory of current DBMS constitute, according to embodiments, parts of the data having assigned the first memory space. Thus, the data structures are also covered by the backup- and/or restore capabilities of embodiments of the invention, thereby increasing the speed of restoring the data.

According to embodiments, the data is a business warehouse system comprising complex table structures. Applying the backup-and/or restore method on business warehouse data may be advantageous as the computationally expensive re-creation of the data when restoring it from a backup can be avoided. According to other embodiments, the data is an application program such as, for example, a Web server or application server.

According to embodiments, each of the one or more images is created by means of a memory snapshot technique applied on the first memory space. The snapshot technique is a copy-on-write snapshot technique, a split-mirror snapshot technique or a redirect-on-write snapshot technique. The features may be advantageous, because existing snapshot-techniques conventionally applied only on data stored in non-volatile storage media can now be applied also for backing up in-memory data by storing the data to another portion of the memory and to a non-volatile storage medium. In addition, reusing the existing technologies previously applied in a different technical setting for creating backups of in-memory data may ease the implementation of the present backup and/a restore approach.

Snapshot technology was hitherto used for recording the state of a non-volatile storage device at any given moment and for preserving that snapshot for restoring purposes. A 'snapshot' of the first memory space as used herein is a copy of the data contained in the first memory space at the moment the snapshot was captured, whereby the copy is not based on a memory-block-wise copying of the data but rather on storing pointers directed at memory blocks having stored the data. A snapshot contains information about all loaded classes, about all existing objects, indices and about references and pointers between objects. In other words, a snapshot is not a 1:1 copy of the data contained in the first memory space, but rather can be considered as a kind of ,table of contents' of the first memory space, the 'table of contents' being as detailed as to allow the complete restoration of the data of the first memory space. Using existing snapshot technologies for creating the images may be advantageous, as the technologies are very fast and allow the creation of an image of several terabyte of data within a few seconds. In a further advantageous aspect, the actual memory size of images generated by a snapshot technique is only a fraction of the size of the first memory space as non-occupied memory blocks may be ignored.

The 'Copy-on-Write (CoW) snapshot technology' is based on the following approach: when the snapshot is first created, only the meta-data about where original data in the first memory space is stored is copied to the second memory space. No physical copy of the data is done at the time the snapshot is created. Therefore, the creation of the snapshot may be executed almost instantaneously. The snapshot copy then tracks the changing blocks on the first memory space (comprising the original data) as writes to the first memory space are performed. The original data that is being written to is copied into the designated second memory space that is set aside for the snapshot before original data is overwritten, hence the name "copy-on-write". Before a write is allowed to a block, copy-on-write moves the original data block to the second memory space. This keeps the snapshot data consistent with the exact time the snapshot was taken. Read requests to unchanged data blocks are redirected to the first memory space comprising the original data, while read requests to data blocks that have been changed are directed to the "copied" blocks in the second memory space. Snapshot contains the meta-data that describes the data blocks that have changed since the snapshot was first created. Note that original data blocks are copied only once per executed snapshot into the snapshot storage (sub-areas of the second memory space) when the first write request is received. CoW snapshot technology may provide for a particularly fast backup method. It may be provided by a separate 'snapshot module' which may be, for example, the IBM Flash Copy, the IBM General Parallel File System (GPFS), or the Linux Logical Volume Manager (LVM). CoW snapshot technology is used according to embodiments of the invention for executing incremental backups.

The 'Split-Mirror snapshot technology' creates a copy (or 'clone') of all data of the first memory space in a current image stored on the second storage space. Whenever a snapshot is created based on the Split-Mirror approach, the data content of the entire first memory space and not only the new or updated portions of the first memory space are duplicated. Images created based on the 'Split-Mirror' approach are highly available, since they are exact duplicates of the original data in the first memory space. However, due to the data copy, such snapshots cannot be created instantaneously. This snapshot method typically requires more storage space than e.g. the CoW approach but may allow a faster data recovery. EMC Symmeterix and AIX Logical Volume Manager support split mirror technology on non-volatile data. The split-mirror snapshot technology is, according to embodiments, analogously applied on the first memory space. Additionally, any raid system supporting multiple mirrors can be used to create an image as a clone of the first memory space by splitting a mirror. Split Mirror snapshot technology may be used according to embodiments of the invention for executing full (i.e., non-incremental) backups.

The 'redirect-on-write snapshot technology' (RoW) is based on reading metadata (location) of occupied blocks of data stored in the first memory space and writing modified data blocks to a new location in a respective sub-area of the second memory space. Thus, contrary to the CoW approach, only one writing step per modified data block is required. Therefore, according to preferred embodiments, RoW is used as snapshot technology. The management module in this case only needs to track pointers to the new memory locations not the actual data itself saving space and processing time. This is being a major benefit compared to transactional logging known from databases systems which need to persist the before and after representation of the data. Only storing the pointers is for the context of the solution possible because the backup and restore step as proposed work here particularly well for the timeline where the backups can be kept in memory. Only when a backup image has to be moved from secondary main memory area the first persistent storage layer data has to be actually copied. RoW snapshot technology is used according to embodiments of the invention for executing incremental backups.

According to embodiments, the one or more non-volatile storage media are assigned to one or more storage tiers. Non-volatile storage media of the same tier share a common characteristic, the characteristic being e.g. an I/O response time, a service level agreement and/or a particular storage medium type, or the like. The storage tiers are ordered in accordance with the characteristic. The shorter the I/O response time, the higher a quality level of the service level agreement. The shorter the I/O response time of any of the storage medium types, the higher the position of any of the storage tiers within a hierarchy of storage tiers.

The second memory space constitutes a further storage tier extending this traditional storage hierarchy at the top with a new layer being in memory in the 'order' or 'hierarchy' of storage tiers. According to at least one of the backup-rules, the storing of the one or more images in the second memory space and the storing of the one or more image copies on the one or more non-volatile storage media is executed in accordance with the order. The storing in accordance with the order begins with the second memory space in the top most storage tier. The features may be advantageous, because they allow integrating the second memory space as the first layer of a hierarchical storage management system comprising several storage tiers.

According to embodiments, a management module being interoperable with a snapshot module, with an application program constituting the data to be assigned to the first memory space and with a state of the art storage management system may implement an interface for communicating with the storage management system, whereby the interface allows the storage management system to recognize and control the second memory space as the top most storage tier. The features may be advantageous because existing hierarchical storage management systems which were designed for managing non-volatile storage media may now be functionality extended to cover also volatile storage. Thus, use case scenarios may be covered where a very quick restoring of a backup image is of crucial importance. Thus, by providing a management module comprising functionalities and APIs which allow the interaction with an existing hierarchical storage management system in a way that the second memory space is considered by the storage management system as top most storage tire, the functionality of the storage management system can be extended. In the extended storage management system, also some portions of the memory can be used for backup and restore purposes without the necessity to acquire additional (quick and usually expensive) storage resources.

According to embodiments, each of the storage tiers has assigned at least one of the backup-rules. The respectively assigned at least one backup-rule specifies a maximum number of the images that can be stored in the one or more storage media of the storage level. In case storing one of the images in the one or more storage media of the storage tier would exceed the maximum number of the images of the storage tier, the oldest one of the already stored images of the storage tier is overwritten by the one image. A rule may be an executable script, an executable binary or any other form of executable program logic operable to execute some backup or restore functions in dependence on some parameter values being evaluated at runtime of the system. Preferentially, the rules or at least the conditional part of the rules can be configured by means of a graphical user interface. Using (configurable) rules for executing the backup strategy may be advantageous as a fully automated and flexibly adaptable backup and restore system is provided which can be customized in dependence on the number and capacities of the available storage tiers and in dependence on application-specific or user-specific requirements.

According to embodiments, the images are created on a regular basis at subsequent time intervals. A time interval may cover a second, a minute, an hour or even days or weeks in dependence on the kind of backup- and/or restore strategy chosen and/or in dependence on the available storage capacity. Each of the storage tiers has assigned at least one of the backup-rules, whereby the respectively assigned backup-rule specifies the time intervals at which any one of the created images shall be stored to the one or more storage media of the storage tier. The time intervals specified for any one of the ordered storage tiers is identical to the time interval specified for the adjacent next top storage tier or is a multiple of the time interval specified for the next top storage tier. The features may be advantageous, because the storage space of higher-level storage tires typically has better I/O response characteristics but is also more expensive. Thus, it may be advantageous to store a comparatively small number of image copies in the higher-level (expensive) storage tiers and overwrite the image copies after comparatively short time periods. As the storage capacity of lower-level storage tiers tends to be cheaper, a large number of image copies may be stored on the lower-level storage tiers, whereby the image copies of the low-level storage tiers may be overwritten after comparatively long time periods. Thus, different kinds of requirements and use case scenarios can be covered: in case a current state of the data of the first memory space needs to be restored quickly, a corresponding request may trigger the execution of some restore-rules which restore the data content of the first memory space by reading the most recent image from the second memory space.

According to embodiments, the storing of the images to the one or more storage media of any one of the storage tiers except the top-level tier comprises: determining, for the storage tier, that according to one of the backup rules assigned to the storage tier, a current one of the images needs to be stored to the storage tier; accessing the one or more storage media of the storage tier directly above the tier, the above storage tier having stored a copy of the current image; creating a further copy of the copy stored in the above storage tier; and creating the further copy in the storage tier. Propagating at least some of the image copies from the top of the storage tier hierarchy to the bottom may be advantageous, as the low-level storage tiers typically are cheaper and provide greater storage capacities, thereby allowing also the storage of long-term pickups. For example, while the first storage tier may consist of volatile storage media, e.g. RAM, the second storage tier may consist of solid-state drive (SSD) storage devices and the lowest storage tier may consist of a tape storage drive. In a further advantageous aspect, copying an image from the storage tier directly above the target tier may be advantageous, as the approach avoids bottlenecks which could arise if a plurality of subordinate storage tiers would all receive their respective image copies from the first storage tier.

According to embodiments, the backup rules orchestrate the creation and storing of the copy of the current image and the creation and storing of the further copy of the current image in any one of the storage tiers in a way ensuring that storing at least parts of the copy and the storing of at least parts of the further copy are executed asynchronously. Preferentially, the asynchronous execution is a parallel execution. That features may be advantageous as they accelerate the backup process and the propagation of the image copies to subordinate storage tiers. For example, as soon as some portions of an image copy of an nth storage tier may be stored, the portions may act as source for starting the copying of the portion to the next, i.e., n+1th, storage tier.

According to embodiments, the creation of each image comprises applying a compression algorithm on the data in the first memory space for reducing the size of the image. This may be advantageous as a reduction in image size not only reduces the amount of required storage space but also increases the time required for executing the backup and/or restore process by a reduction of network traffic. Depending on the embodiment, different compression algorithms such as DEFLATE, LZ-compression or data deduplication algorithms may be used. According to embodiments, the images stored in the first storage tier, i.e., the second memory space, are not compressed, but the copying of the image from the first to the second storage tier comprises applying the compression algorithm on the copied image. The feature may further increase the speed of creating the in-memory backups.

According to embodiments, restoring the application program for a given moment in time in accordance with the one or more backup-rules comprises accessing the second highest storage tier for restoring the first application in the first memory space from a copy of the image having been stored for the given moment in time in the storage tier. In case the copy of the image is not stored on the storage tier, cascading down the storage tiers in accordance with their order and repeating the above accessing step for each of the storage tiers until the copy the first application could be restored from a copy of the image stored to the storage tier. The features may be advantageous, because the I/O access times of higher-ordered storage tiers tend to be shorter and restore operations starting from the storage tiers therefore tend to be faster.

According to embodiments, all the storage tiers are managed by means of a storage management system such as, for example, the IBM Tivoli Storage Manager. The creation and storing of the images and the restoring of the first application in the first memory space from one of the images is achieved by means of a management module being interoperable with a snapshot module and the storage management system.

According to embodiments, the one or more images are created and stored by means of an incremental backup method, e.g. by means of a CoW or RoW snapshot technology. Each image consists of references to data contained in an original image having been created at a first (original') moment in time, and one or more incremental data packets. Each of the incremental data packets of the image respectively comprises all changes of the data introduced during one of the subsequent time intervals between the first and a current moment in time. Thus, a current image consists of a combination of the original image and all incremental data packets relative to the data in the original image having been yet been generated. According to embodiments, only the images created in the first storage tier are created as incremental backups. The image copies stored to the low-level storage tiers are preferentially full images as the storage space in the low-level storage tiers is cheaper and using full-images may increase the speed of restoring the data.

According to some embodiments, none of the images or image copies is an incremental backup. Rather, each image and image copy is created as full image comprising all the data required to restore the current data content of the first memory space. The features may be advantageous as restoring memory content from a full-image may be faster than restoring it from an incremental backup file. This is because for restoring incremental backups, the incremental backup portion (often consisting of a log of all amendments applied on the data since the first moment in time) and the original data content portion must be evaluated in order to apply all amendments specified in the incremental portion of the backup on the unchanged, original backup portion. Some columnar DBMS like Vertica®, SAP HANA and others, for example, come with some inbuilt backup/restore capabilities being based on restoring logged amendments to an unaltered data portion. However, the kind of backups tend to be computationally demanding.

According to embodiments, the method comprises providing a user with graphical user-interface means for configuring the maximum size of the second memory space and/or for modifying the backup and/or restore rules.

In a further aspect, the invention relates to a computer-readable medium comprising computer-readable program code embodied therewith. Upon execution of the instructions by a processor, the instructions cause the processor to execute a method according to anyone of the embodiments described above.

In a further aspect, the invention relates to a computer system comprising a main memory, a management module, means for accessing one or more predefined backup-rules and/or for accessing one or more predefined restore-rules, and an interface for operatively coupling the management module to a storage management system. The storage management system is operable to manage one or more non-volatile storage media. The management module is adapted for creating a backup of data and/or restoring the data.

The creation of the backup comprises:
assigning a first memory space in the main memory to the data and loading the data into the first memory space;
allocating a second memory space in the main memory for acting as container of one or more images of the first memory space;
automatically creating the one or more images; and
automatically storing the created one or more images in the second memory space and storing a respective copy of at least one of the images in the one or more non-volatile storage media, the storing in the second memory space and in the storing in the one or more non-volatile storage media being executed in accordance with one or more predefined backup-rules.

Restoring the data comprises:
automatically reading one of the or more images from the second memory space or reading one of the one or more copies of the images from the one or more non-volatile storage media, the reading being executed in accordance with one or more predefined restore-rules; and
copying the read image or image copy into the first memory space of the main memory for restoring data being assigned to the first memory space.

According to some embodiments, the computer system comprises the computer-readable medium, whereby the medium may be integral part of the computer comprising the processor or may be operatively coupled to the processor e.g. by means of a network connection allowing the processor to access the first columns.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized. A computer-readable medium may be, for example, a computer readable non-volatile storage medium or a computer-readable signal medium such as, for example, a propagated data signal with computer-readable program code embodied therein, for example, in baseband or as part of a carrier wave.

FIG. 1 shows a flowchart of a method for creating in step 114 an image of data contained in a first memory space and/or for restoring, in step 116, the data from one of the images. The backup and/or restore steps may be executed by a management module 210 as depicted in FIG. 2, whereby according to some embodiments some tasks such as snapshot generation or the management of a plurality of different storage tiers may be executed by interoperable components such as the snapshot module 214 or a hierarchical storage management system 244.

In a first step 102, the first memory space 220 of the main memory 218 of a computer system 202 is assigned to an application program 208. This assignment implies that the data is loaded into the first memory space 220 and does not use or occupy any memory blocks outside the first memory space 220. In step 104, a second memory space 232 is allocated, i.e., reserved, for acting as a container of one or more images 233-240 of the data contained in the first memory space 220. In step 106, the one or more images are automatically created. For example, the images may be created sequentially after predefined time intervals. The created one or more images are stored automatically in step 108 in the second memory space 232. In addition, a copy of at least one of the images is stored in the one or more non-volatile storage media 250, 276, 290. Restoring the data content of the first memory space 220 from one of the images 233-240 by the management module 210 may comprise the step 110 of automatically reading one of the one or more images from the second memory space or reading one of the one or more image copies 252-262, 264-274, or 278-288 from one of the non-volatile storage media 250, 276, or 290, respectively, in dependence on some decision taken by one or more restore rules. In step 112, the read image or image copy is copied into the first memory space 220 of the main memory 218 in order to restore the data being assigned to the first memory space. In case the read image was a compressed image, the image is de-compressed before it is stored to the first memory space. The data may be an application program 222 comprising some application specific or user specific data 224, one or more indices 226, a WOS 228 and a ROS storage 230.

Figure 2:
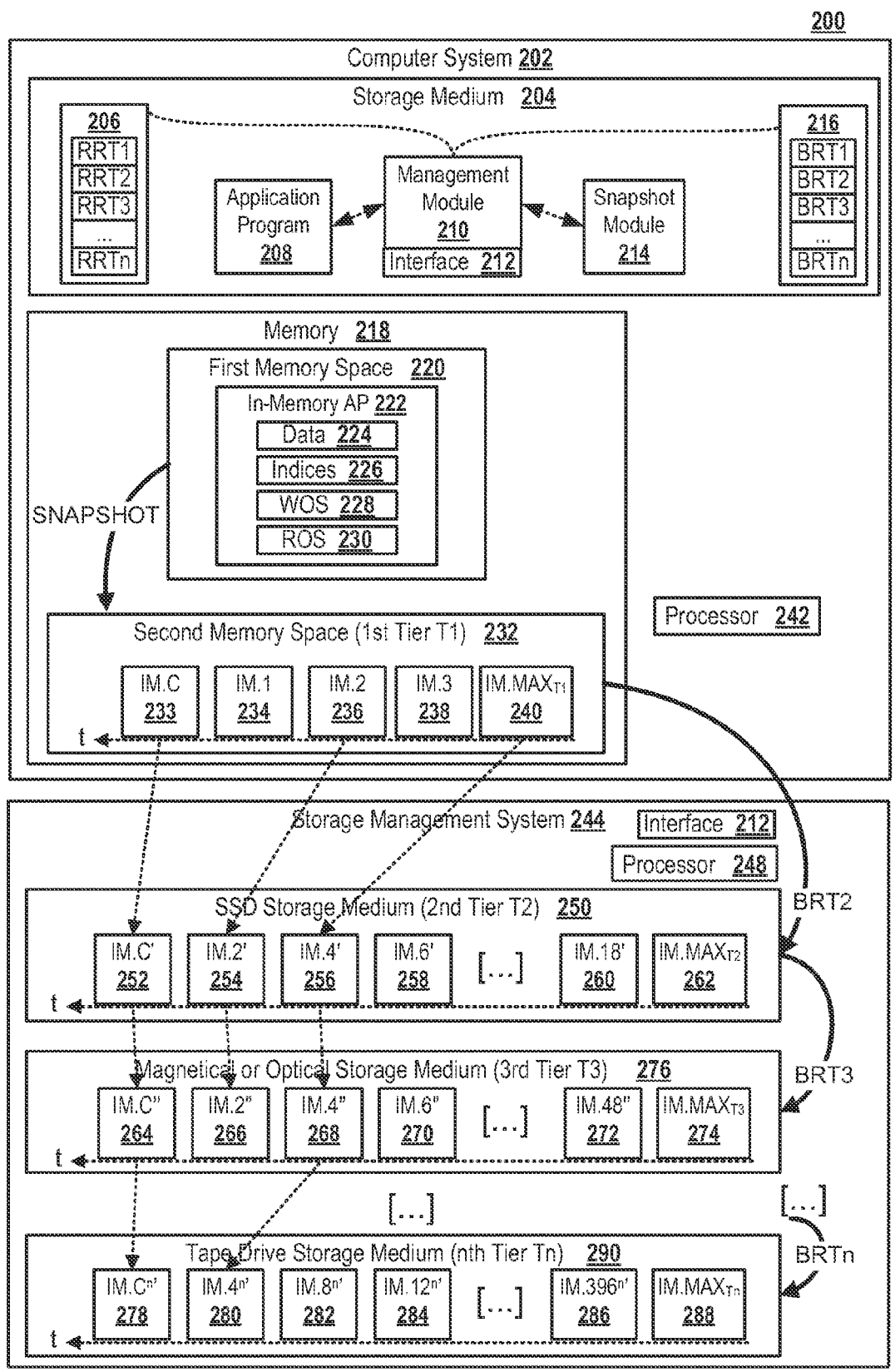
FIG. 2 shows a block diagram of a computer system comprising a hierarchical storage system.

FIG. 2 shows a block diagram of a computer system 202 comprising a storage medium 204 having stored therein instructions for executing, by a processor 242, a management module 210, an application program 208, e.g. a relational database management system, and a snapshot module 214. In addition, the storage medium comprises a plurality of restore-rules 206 and backup rules 216.

An example for a backup-rule BRT1 used for storing a copy of a recently created image from the first storage tier in the second storage tier T2 could be a script comprising the following program logic:

upon creating the image, determining, if the image should be copied to the second storage tier (some rules might copy every created image to the next lower storage tier, while others may copy only every second or third or nth image to the next lower storage tier).

In case the copy of the current image should be stored in the second storage tier according to BRT1, determining a maximum number MAX.T2 of images which can be stored in the second storage tier T2 given the storage capacity of the storage tier. If the second storage tier comprises as many images as possible given the determined maximum number MAX.T2, storing the current image in the second storage tier by overwriting the oldest image copy stored in the second storage tier. If the second storage tier comprises fewer images than the maximum possible number MAX.T2 of images, storing the current image in the second storage tier in addition to the already stored images. Preferentially, each image and image copy comprises time stamp information allowing the rules to automatically determine the time when the respective image or image copy was stored.

In other embodiments, the application program, the restore-rules 206 and/or the backup-rules 216 may be stored to another storage medium operatively coupled to the computer system 202. The computer system further comprises a main memory 218 which comprises a first memory space 220 being assigned to the application program 208 and a second memory space 232 used as a container for storing one or more images 233, 234, 236, 238 and 240 of the first memory space. After having loaded the application program 208 into the first memory space 220, one or more indices 226, or other data structures 228, 230 having been derived from the non-executable data 224 managed by the database management system 208 may also be contained in the first memory space 220. Thus, the in-memory data structures 222 of the application program 208 may comprise additional data structures compared with the application program 208 as stored in the non-volatile storage medium 204. The management module 210 comprises an interface 212 allowing the management module two interoperate with a storage management system 244 in a way that the second memory space 232 is provided to the storage management system 244 as a topmost storage tier of a hierarchy of storage tiers 232, 250, 276 and 290 being managed by the storage management system 244. The storage management system 244 having stored therein instructions for executing, by a processor 248, may be hosted by the computer system 202 or by another computer system connected to the computer system 202 via a network, e.g. the Internet or an intranet. Thus, the computer system 202 and the storage management system 244 may constitute a distributed networked computer system 200. The management module 210 may execute, on a regular basis, some backup steps for creating, at given time intervals, images of the data content of the first memory space 220. Preferentially, the images are created by the snapshot module 214 which is called by the management module 210 at the respective moments in time. After having stored the snapshots 233, 234, 236, 238 and 240 in the second memory space 232, the management module 210 and the storage management system 244 interoperatively create further copies of the images 233, 234, 236, 238 and 240 and store those copies 252-262, 264-274, and 278-288 in succeeding tiers 250, 276, and 290 of the hierarchical storage management system 244. Thereby, one or more backup-rules determine if and when a copy of an image should be created or overwritten by a newer image in each respective storage tier. The rules may be adapted in dependence on the I/O characteristics, free storage capacities and/or the price of each respective storage tier. The time axis corresponding to the chronological order of creating the respective images or image copies is indicated in each of the storage tiers by means of a dotted arrow. One or more backup rules BRL2 automatically control the copying of images from the first storage tier to the second storage tier. One or more backup rules BRL3 may manage the copying of images from the second storage tier T2 to the third storage tier T3, and so on, thereby guaranteeing that at least some of the images created by the snapshot module are cascaded downwards. Finally, at least some of the created image copies are stored to a storage tier adapted for providing some long-term backup means, e.g. a storage tier being based on tape drives. For example, the image 233 generated by the snapshot module is the most recent image. Image 234 is the second most recent image, image 236 is the third most recent image, and so on. The first storage tier (i.e., the second memory space) comprises a maximum capacity of MAX.T1. As soon as the number of images stored in the first storage tier exceeds the capacity of the tier, the oldest image is overwritten by a newly created image. The maximum capacity IM.MAX may be different for different storage tiers. Preferentially, the maximum capacity is largest for storage tiers being at the bottom of the hierarchy and consisting preferentially of cheaper storage media. Preferentially, a higher storage capacity of a storage tier corresponds to a higher number of image copies which can be stored, according to the respective backup rules, until the oldest image is overwritten. Depending on the embodiments, the rules may cause a copying of each generated image from the second memory space to all the succeeding storage tiers or a copying of each mth created image, wherein m may be any integer greater than 1. In FIG. 2, every second generated image is copied from the first to the second storage tier, each image copy stored to the second storage tier is copied to the third storage tier, and every second image copy stored in the third storage tier is copied, directly or via one or more further storage tiers, to the nth storage tier at the bottom of the hierarchy.

Figure 3:
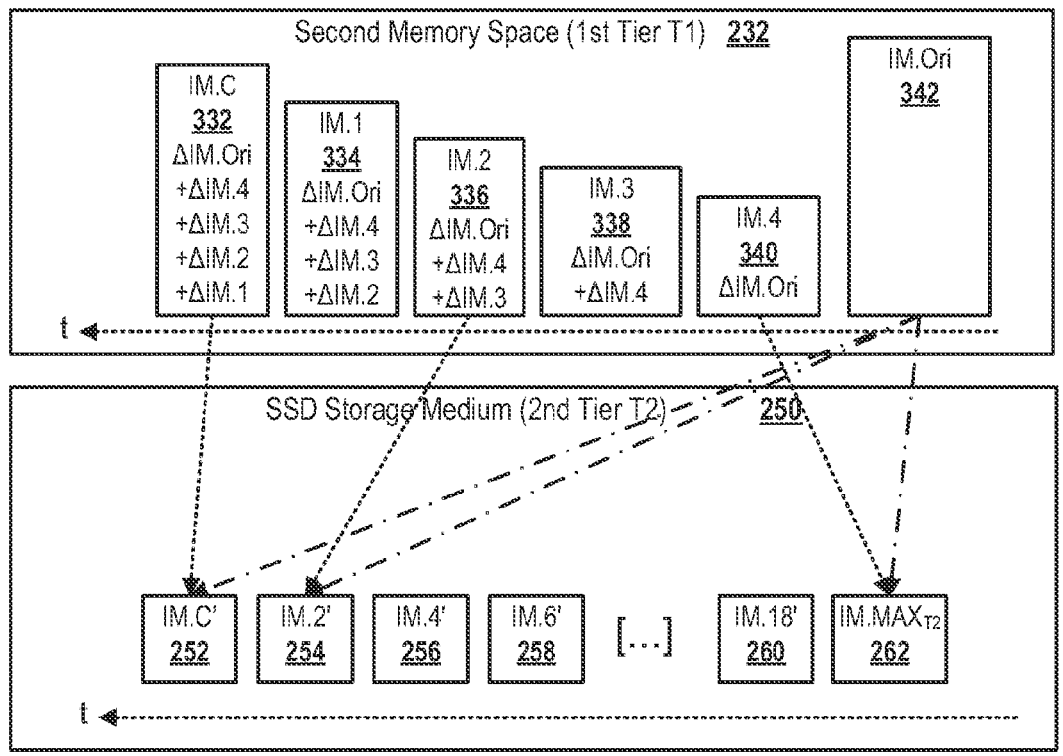
FIG. 3 shows the first and second storage tiers in greater detail.

FIG. 3 depicts the data content of the first and second storage tier of an embodiment employing an incremental backup strategy in the first storage tier in greater detail. In a particular moment in time, e.g. at the moment of loading the data to the first memory space, a full snapshot 342 is created and stored to the second memory space 232. After predefined time intervals, incremental backups 340, 338, 336, 334 and 332 are created, respectively comprising all amendments of the data content of the first memory space relative to the original content. The original content at a 'first' or 'original' moment in time corresponds to the full snapshot image 342. According to other embodiments (not shown), each incremental image 332-340 may comprise only the increments relative to the previous snapshot. In the depicted embodiments, the image copies 252-262 stored in the second storage tier 250 are full images. They are assembled during each copying process from the first to the second storage tier from the original full image 342 and a respective incremental (partial) image. For example, image copy 254 is assembled from incremental image 336 and the full image 342. By storing the images as incremental backups at least in the first storage tier, the (comparatively expensive) non-volatile storage constituting the first storage tier can be used more effectively.

Figure 4:
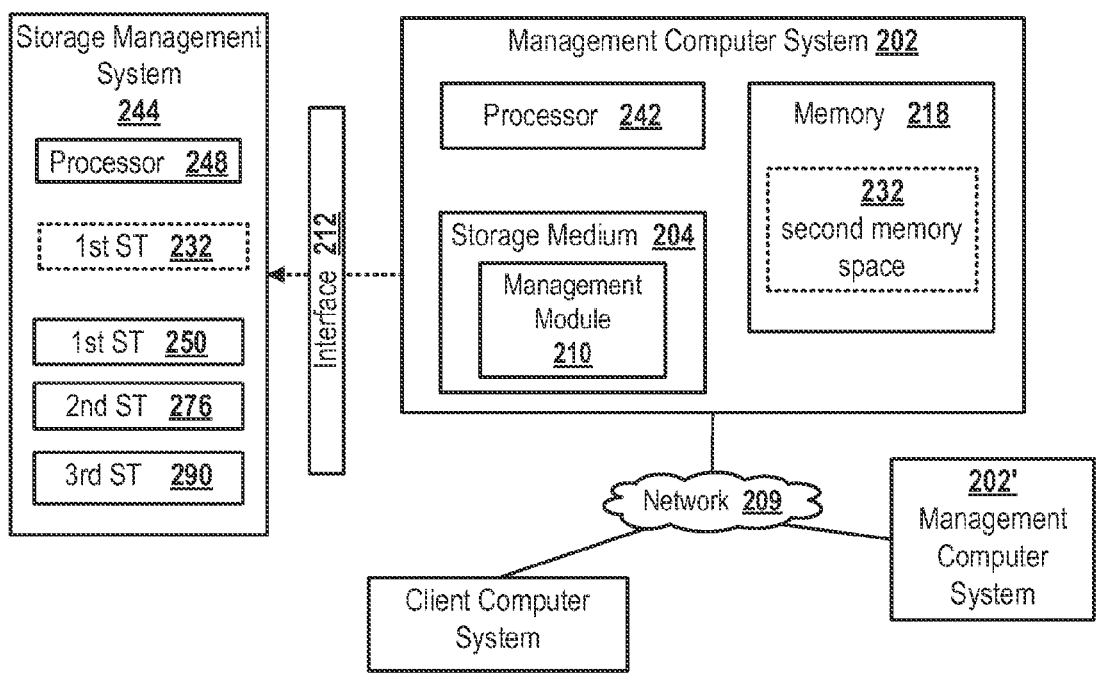
FIG. 4 shows a block diagram of a computer system operatively coupled to a storage management system.

FIG. 4 shows a distributed computer system comprising a management computer system 202 being operatively coupled via interface 212 to a storage management system 244. The interface 212 may be based on a network connection, e.g. an Internet connection. From an application-level perspective, the interface 212 allows the management module 210 of the management computer system 202 to interoperate with a hierarchical storage management system 244 comprising a plurality of storage tiers 232, 250, 276 and 290, whereby the first storage tier is "emulated" by an interoperation of the management module 210 within storage medium 204 having stored therein instructions for executing, by a processor 242, and the storage management system 244. The first storage tier is physically based on the second memory space 232 of the main memory 218 of the management computer system 202. The management computer system 202 may be connected via a network 209 to one or more client computer systems which may send requests for retrieving data provided by the application program 208. In case the computer system 202 is not able to send the requested data, e.g. because a power failure has destroyed the content of the main memory, the most recent backup image stored to one of the storage tiers being based on non-volatile storage media is preferentially used according to the restore-rules for quickly restoring the content of the first memory space. In case the requested data cannot be delivered within a predefined response time, e.g. due to a high processing load of the computer system 202, the management module 210 may send a command to another management computer system 202' basically comprising the same components as computer system 202 for creating further instances of the application program 208 in the main memory of the other management computer system 202'. Providing further instances of the application program in the main memory of other computer systems may help to increase the speed of data delivery to one or more clients.

The invention claimed is:

1. A computer implemented method for creating a backup of data by a computer system being operatively coupled to a main memory and to one or more non-volatile storage media, wherein the creation of the backup comprises:
   assigning a first memory space in the main memory to the data and loading the data into the first memory space;
   allocating a second memory space in the main memory for acting as container of one or more images of the data in the first memory space;
   automatically creating the one or more images of the data in the first memory space; and
   automatically storing the created one or more images in the second memory space and storing a respective copy of at least one of the one or more images in the one or more non-volatile storage media, the storing in the second memory space and in the storing in the one or more non-volatile storage media being executed in accordance with one or more predefined backup-rules, wherein the one or more non-volatile storage media are assigned to one or more storage tiers, wherein non-volatile storage media of a same tier share a common characteristic, the common characteristic being an I/O response time, a service level agreement, or a particular storage medium type, wherein the one or more storage tiers are configured in a hierarchical order in accordance with the common characteristic, and wherein a shorter the I/O response time, the higher a quality level of the service level agreement or wherein the shorter the I/O response time of any of a set of storage medium types, the higher the position of any of one or more storage tiers to which the one or more non-volatile storage media are assigned.

2. The computer implemented method of claim 1, further comprising:
   restoring the data from the one or more images from the second memory space, the restoring comprising:
      automatically reading one of the one or more images from the second memory space or reading one of the one or more copies of the images from the
   one or more non-volatile storage media, the reading being executed in accordance with one or more predefined restore-rules; and copying the read image or copy of the image into the first memory space of the main memory for restoring data being assigned to the first memory space.

3. The computer implemented method of claim 1, wherein the data is a functional module of the application program and wherein the functional module is loaded into the first memory space for executing the functional module.

4. The computer implemented method of claim 1, wherein each of the one or more images is created by applying a memory snapshot technique on the first memory space, the memory snapshot technique being selected from:
copy-on-write;
split-mirror; or
redirect-on-write.

5. The computer implemented method of claim 1,
wherein each of the one or more storage tiers has assigned at least one of the backup-rules, the respectively assigned backup-rule specifying a maximum number of the images that can be stored in the one or more storage media of the storage tier, and
wherein in case storing one of the images in the one or more storage media of the storage tier would exceed the maximum number of the images of the storage tier, the oldest one of already stored images of the storage tier is overwritten by the one image.

6. The computer implemented method of claim 5, wherein the one or more images are created on a regular basis at subsequent time intervals,
wherein each of the one or more storage tiers has assigned at least one of the backup-rules, the respectively assigned backup-rule specifying the time intervals at which any one of the created images shall be stored to the one or more storage media of the storage tier, and
wherein time intervals specified for any one of the ordered storage tiers is identical to the time interval specified for the storage tier directly above the storage tier or is a multiple of the time interval specified for the storage tier directly above the storage tier.

7. The computer implemented method of claim 6, wherein the storing of the one or more images to the one or more storage media of any one of the one or more storage tiers except the top-level tier comprises:
determining, for a first storage tier, that according to one of the backup rules assigned to the first storage tier, a current one of the images needs to be stored to the first storage tier;
accessing the one or more storage media of a second storage tier directly above the first storage tier, the second storage tier having stored a copy of the current image;
creating a further copy of the copy stored in the second storage tier;
creating the further copy in the first storage tier.

8. The computer implemented method of claim 7, further comprising:
orchestrating, by the backup rules, the creation and storing of the copy of the current image and the creation and storing of the further copy of the current image in any one of the storage tiers in a way ensuring that storing at least parts of the copy and the storing of at least parts of the further copy are executed asynchronously, wherein preferentially the asynchronous execution is a parallel execution.

9. The computer implemented method of claim 1, wherein the creation of each image of the one or more images comprises applying a compression algorithm on the data in the first memory space for reducing the size of the image.

10. The computer implemented method claim 1,
wherein restoring the application program for a given moment in time in accordance with the one or more backup-rules comprises:
accessing the second highest storage tier for restoring a first application in the first memory space from the copy of the image having been stored for the given moment in time in the second highest storage tier; and
in case the copy of the image is not stored on the second highest storage tier, cascading down one or more remaining storage tiers in the one or more storage tiers in accordance with their order and repeating the above step for each of the one or more storage tiers until the copy the first application could be restored from a copy of the image stored to the one or more remaining storage tiers.

11. The computer implemented method of claim 1,
wherein all the one or more storage tiers are managed by a storage management system; and
wherein the creation and storing of the one or more images and the restoring of the first application in the first memory space from one of the one or more images is achieved by means of a management module being interoperable with a snapshot module and the storage management system.

12. The computer implemented method of claim 1, wherein the second memory space constitutes a further storage tier being on top of an order of one or more storage tiers to which the one or more non-volatile storage media are assigned.

13. The computer implemented method of claim 1, wherein, according to at least one of the predetermined backup-rules, the one or more images are stored in the second memory space before the one or more copies of the images are stored in the one or more non-volatile storage media.

14. A computer program product comprising a non-transitory computer-readable storage medium having computer-readable program embodied therewith, wherein the computer-readable program, when executed on a computing device, cause the computing device to:
in order to create a backup of data, assign a first memory space in a main memory to the data and loading the data into the first memory space, wherein the main memory is operatively coupled to the computing device and to one or more non-volatile storage media;
allocate a second memory space in the main memory for acting as container of one or more images of the data in the first memory space;
automatically create the one or more images of the data in the first memory space; and
automatically store the created one or more images in the second memory space and storing a respective copy of at least one of the one or more images in the one or more non-volatile storage media, the storing in the second memory space and in the storing in the one or more non-volatile storage media being executed in accordance with one or more predefined backup-rules, wherein the one or more non-volatile storage media are assigned to one or more storage tiers, wherein non-volatile storage media of a same tier share a common characteristic, the common characteristic being an I/O response time, a service level agreement, or a particular storage medium type, wherein the one or more storage tiers are configured in a hierarchical order in accordance with the common characteristic, and wherein a shorter the I/O response time, the higher a quality level of the service level agreement or wherein the shorter the I/O response time of any of set of storage medium types, the higher the position of any of one or more storage tiers to which the one or more non-volatile storage media are assigned.

15. A computer system comprising:
a processor; and
a main memory coupled to the processor, wherein the main memory is operatively coupled to a computing device and to one or more non-volatile storage media and wherein the main memory comprises instructions which, when executed by the processor, cause the processor to:
in order to create a backup of data,
assign a first memory space in the main memory to the data and load the data into the first memory space;
allocate a second memory space in the main memory for acting as container of one or more images of the data in the first memory space;
automatically create the one or more images of the data in the first memory space; and
automatically store the created one or more images in the second memory space and storing a respective copy of at least one of the one or more images in the one or more non-volatile storage media, the storing in the second memory space and in the storing in the one or more non-volatile storage media being executed in accordance with one or more predefined backup-rules, wherein the one or more non-volatile storage media are assigned to one or more storage tiers, wherein non-volatile storage media of a same tier share a common characteristic, the common characteristic being an I/O response time, a service level agreement, or a particular storage medium type, wherein the one or more storage tiers are configured in a hierarchical order in accordance with the common characteristic, and wherein a shorter the I/O response time, the higher a quality level of the service level agreement or wherein the shorter the I/O response time of any of a set of storage medium types, the higher the position of any of one or more storage tiers to which the one or more non-volatile storage media are assigned.

16. The computer system of claim 15, wherein the second memory space constitutes a further storage tier being on top of an order of one or more storage tiers to which the one or more non-volatile storage media are assigned.

17. The computer system of claim 15, wherein, according to at least one of the predetermined backup-rules, the one or more images are stored in the second memory space before the one or more copies of the images are stored in the one or more non-volatile storage media.

* * * * *